(12) United States Patent
Zhang et al.

(10) Patent No.: US 10,632,578 B2
(45) Date of Patent: Apr. 28, 2020

(54) ASSEMBLY METHOD FOR DC CONVERTER VALVE

(71) Applicants: NR ELECTRIC CO., LTD, Jiangsu (CN); NR ENGINEERING CO., LTD, Jiangsu (CN); NR ELECTRIC POWER ELECTRONICS CO., LTD., Jiangsu (CN)

(72) Inventors: Xiang Zhang, Jiangsu (CN); Fan Yang, Jiangsu (CN); Guoxing Bai, Jiangsu (CN); Zhao Li, Jiangsu (CN); Liang Liu, Jiangsu (CN); Xiaodong Shi, Jiangsu (CN)

(73) Assignees: NR ELECTRIC CO., LTD, Jiangsu (CN); NR ENGINEERING CO., LTD, Jiangsu (CN); NR ELECTRIC POWER ELECTRONICS CO., LTD., Jiangsu (CN)

( * ) Notice: Subject to any disclaimer, the term of this patent is extended or adjusted under 35 U.S.C. 154(b) by 272 days.

(21) Appl. No.: 15/747,764

(22) PCT Filed: Jul. 13, 2016

(86) PCT No.: PCT/CN2016/089944
§ 371 (c)(1),
(2) Date: Jan. 26, 2018

(87) PCT Pub. No.: WO2017/016392
PCT Pub. Date: Feb. 2, 2017

(65) Prior Publication Data
US 2018/0214997 A1    Aug. 2, 2018

(30) Foreign Application Priority Data

Jul. 28, 2015 (CN) .......................... 2015 1 0452757

(51) Int. Cl.
*B23P 21/00* (2006.01)
*H02G 7/00* (2006.01)

(52) U.S. Cl.
CPC ................ *B23P 21/00* (2013.01); *H02G 7/00* (2013.01)

(58) Field of Classification Search
CPC ................................. B23P 21/00; H02G 7/00
See application file for complete search history.

(56) References Cited

FOREIGN PATENT DOCUMENTS

| CN | 103023312 | 4/2013 |
|---|---|---|
| CN | 204089617 | 1/2015 |

(Continued)

OTHER PUBLICATIONS

"International Search Report (Form PCT/ISA/210)", dated Oct. 25, 2016, with English translation thereof, pp. 1-4.

*Primary Examiner* — Carl J Arbes
(74) *Attorney, Agent, or Firm* — JCIPRNET

(57) ABSTRACT

An assembly method for a DC converter valve includes: assembling a top shielding case: lifting the top shielding case to a designated height via a lifting platform, and then fixedly connecting the top shielding case to lower ends of insulators, fixedly connecting upper ends of the insulators to a truss, the truss being located on the top of a valve hall; assembling valve layers: lifting the valve layers to designated locations in a sequence from top to bottom via the lifting platform; and assembling a bottom shielding case: lifting the bottom shielding case to a designated height via the lifting platform, connecting the bottom shielding case to a lowermost valve layer and suspending the bottom shielding case below the lowermost valve layer via suspension insulators. By means of the present invention, the operation is convenient, a small quantity of devices is used, and the security and reliability are high.

15 Claims, 3 Drawing Sheets

(56) References Cited

FOREIGN PATENT DOCUMENTS

| | | | |
|---|---|---|---|
| CN | 103378574 B | * | 3/2015 |
| CN | 204490355 | | 7/2015 |
| CN | 105014374 | | 11/2015 |
| DE | 10342677 | | 5/2005 |

* cited by examiner

ASSEMBLY METHOD FOR DC CONVERTER VALVE

CROSS-REFERENCE TO RELATED APPLICATION

This application is a 371 application of International PCT application serial no. PCT/CN2016/089944, filed on Jul. 13, 2016, which claims the priority benefit of China application no. 201510452757.9, filed on Jul. 28, 2015. The entirety of each of the abovementioned patent applications is hereby incorporated by reference herein and made a part of this specification.

TECHNICAL FIELD

The present invention relates to the field of DC converter valves, and in particular, to an assembly method for a DC converter valve.

BACKGROUND OF THE INVENTION

A thyristor converter valve tower used in common DC transmission is usually suspended on a truss on the top of a valve hall, and layers are connected via an insulation pull rod or an insulator. An advantage of this fixing manner is a good damping effect. However, because the truss is high, valve layers are heavy, and insulators between layers can bear only tensile force not support force, the entire valve tower cannot be assembled on the ground before suspension, and needs to be assembled high above the ground. Consequently, there are great difficulties.

There is a kind of suspension and assembly method at present, first, all suspension insulators or insulation pull rods and bearing beams of each valve layer are lifted to high above the ground via a device and are assembled, and a "framework", of the entire valve tower is formed after the assembly; Then, thyristor modules and reactor modules in each valve layer are lifted to high above the ground one by one and are installed on corresponding locations. Advantages of this method are as follows: weight of each lifting is not large and requirements on devices are relatively low. However, a major disadvantage lies in that because only one module is lifted and assembled each time, installation of the entire valve tower is time-consuming and has relatively low efficiency.

SUMMARY OF THE INVENTION

An objective of the present invention is to provide an assembly method for a DC converter valve, with which the operation is convenient, a small quantity of devices are used, and the security and reliability are high, and the method is especially applicable to a high-voltage DC converter valve tower.

To achieve the foregoing objective, the following technical solutions are used in the present invention: an assembly method for a DC converter valve characterized in that comprises the steps of:

assembling a top shielding case: lifting the top shielding case to a designated height via a lifting platform, and then, fixedly connecting the top shielding case to lower ends of insulators, upper ends of the suspension insulators are fixedly connected to a truss 1, and the truss 1 is located on the top of a valve hall;

assembling valve layers: lifting the valve layers to designated locations in a sequence from top to bottom via the lifting platform; when a first valve layer is lifted to a designated location via the lifting platform, connecting the first valve layer to the top shielding case and suspending the first valve layer below the top shielding case via the suspension insulators; when an adjacent next valve layer is lifted to a designated location via the lifting platform, connecting the adjacent next valve layer to an adjacent previous valve layer and suspending the adjacent next valve layer below the adjacent previous valve layer via the suspension insulators; and repeating the foregoing steps until a lowermost valve layer is connected to an adjacent previous valve layer and suspended below the adjacent previous valve layer; and assembling a bottom shielding case: lifting the bottom shielding case to a designated height via the lifting platform, and connecting the bottom shielding case to the lowermost valve layer and suspending the bottom shielding case below the lowermost valve layer via the suspension insulators.

As an improved technical solution of the present invention, an area of the lifting platform is greater than an area of the top shielding case, an area of the valve layer, and an area of the bottom shielding case respectively, a quantity of suspension insulators required by each valve layer can be placed on the lifting platform at the same time, and working personnel can stand thereon.

As an improved technical solution of the present invention, the lifting platform is provided with rollers at the bottom; before each lifting of the lifting platform, the lifting platform is moved horizontally on the ground to an appropriate location, and the top shielding case, the valve layers, or the bottom shielding case are placed on the lifting platform via a hoisting device.

As an improved technical solution of the present invention, the suspension insulators are also placed on the lifting platform.

As an improved technical solution of the present invention, during lifting of the lifting platform, the top shielding case, the valve layers, or the bottom shielding case are located at the center of the lifting platform, and the suspension insulators are evenly placed around the top shielding case, the valve layers, or the bottom shielding case.

As an improved technical solution of the present invention, once installation and fixation of the top shielding case, the valve layers, or the bottom shielding case are completed, the lifting platform is lowered to the ground for next lifting and installation.

As an improved technical solution of the present invention, lifting and lowering of the lifting platform are controlled via a suspension cable and pulleys 8.

In the present assembly method for a DC converter valve, characterized in that, the lifting platform having an area greater than the area of the shielding case or the valve layer is used in the method, the top shielding case, the valve layers, and the bottom shielding case are lifted to designated heights in a sequence from top to bottom of a valve tower during actual suspension, and thereafter, the top shielding case, the valve layers, and the bottom shielding case are suspended and fixed via the suspension insulators. The area of the lifting platfouii is greater than the area of the valve tower shielding case and the area of the valve layer, a quantity of suspension insulators required by each valve layer can be placed on the lifting platform at the same time, and at least four working personnel can stand thereon. When the lifting platform is used to lift the layers of the valve tower, only one shielding case or one valve layer is lifted at each time, and the lifting is performed in a sequence according to the sequence in position from top to bottom of the valve tower during actual suspension. The lifting platform is provided with rollers at the bottom. Before each lifting, the lifting platform is moved horizontally on the ground to the appropriate location, the shielding case or the valve layers are placed on the lifting platform via the hoisting device, and the required suspension insulators are placed on the lifting platform. During lifting, the shielding case or the valve layers should be located at the center of the entire lifting platform, and the suspension insulators are evenly distributed around the shielding case or the valve layers. When the lifting platform is lifted to a designated height, the working personnel install and fix the shielding case or the valve layers and the suspension insulators, and once the installation and fixation are completed, the lifting platform is lowered to the ground for next lifting and installation.

Beneficial Effects of the Present Invention are as Follows:

1. A lifting platform having an area greater than an area of a shielding case and area of the valve layer is used to lift the entire shielding case or valve layers to high above the ground for suspension and assembly, an entire valve tower can be assembled after only a few times of lifting, and the efficiency is very high.

2. During working, the working personnel stand on the lifting platform, and fix the insulators on an upper-layer shielding case or valve layer via a lifting lug. In the entire assembly process, a small quantity of devices is used. The operation is convenient, and the reliability is high.

DETAILED DESCRIPTION

The following further describes the present invention with reference to the accompanying drawings and specific embodiments in detail.

Figure 1:
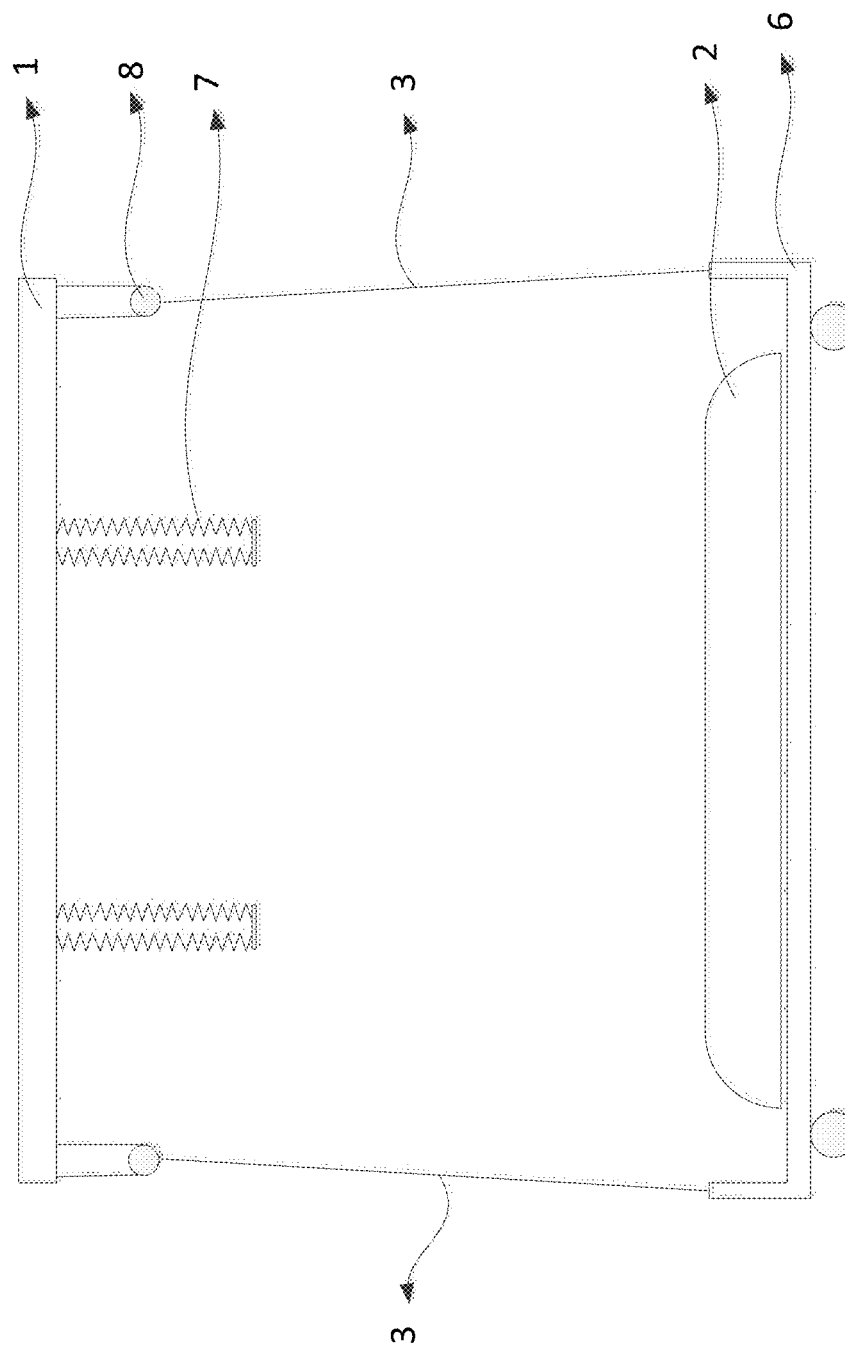
FIG. 1 is a schematic view of a top shielding case being suspended.

As shown in FIG. 1, a truss 1 is located on the top of a valve hall, and insulators 7 used to suspend an entire valve tower are suspended below the truss 1. When a top shielding case 2 is being installed, first a lifting platform 6 is moved to an appropriate location on the ground via bottom rollers, then the top shielding case 2 is placed on the lifting platform 6 via a hoisting device, then the lifting platform 6 is moved to a location directly under a suspension cable 3 via the bottom rollers, the suspension cable 3 is connected to the lifting platform 6, and the suspension cable 3 lifts the lifting platform 6 to a location below the insulators 7 via pulleys 8. Working personnel are lifted to a same height via another device, and then climb to the lifting platform 6. The location of the lifting platform 6 is adjusted by controlling the suspension cable 3. After suspension points are aligned in position, the working personnel suspend the top shielding case 2 from the insulators 7. Then, the top shielding case is installed completely.

Figure 2:
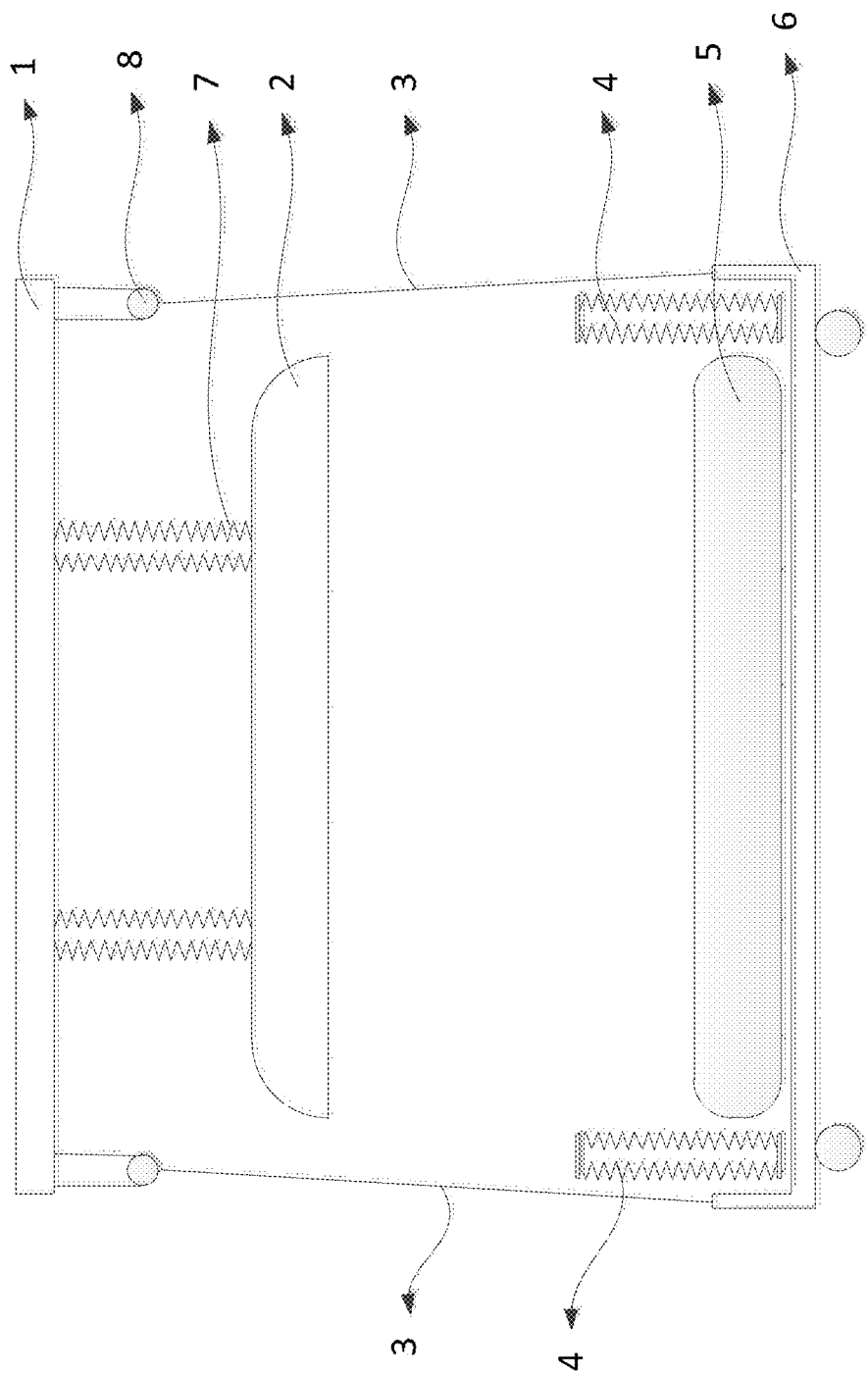
FIG. 2 is a schematic view of a first valve layer being suspended.
Figure 3:
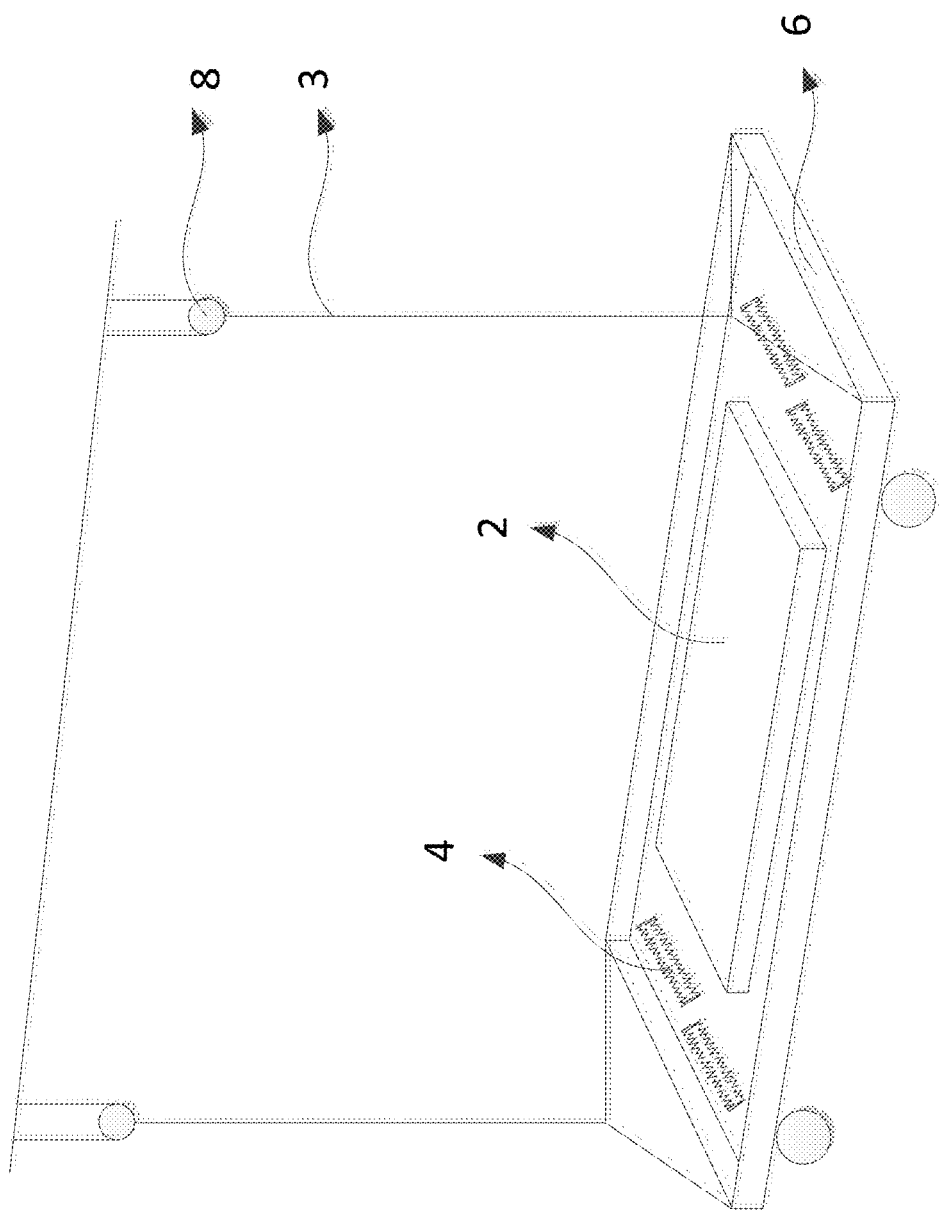
FIG. 3 is a 45-degree view of a top shielding case being suspended.

Once the top shielding case 2 is installed completely, the lifting platform 6 is lowered to the ground, and installation of the first valve layer 5 starts. As shown in FIG. 2, similarly, the lifting platform is moved to an appropriate location via the bottom rollers. The valve layer 5 is placed on the lifting platform 6 via the hoisting device, and suspension insulators 4 between the top shielding case and the first valve layer 5 are also placed on the lifting platform. Then, the lifting platform 6 is moved horizontally to a location directly under the suspension cable 3, and after the suspension cable 3 is connected to the lifting platform 6, the suspension cable 3 lifts the lifting platform 6 to a location below the top shielding case via the pulleys 8. First, the suspension insulators 4 are fixed to corresponding suspension points on the top shielding case. Then, the location of the lifting platform 6 is adjusted by controlling the suspension cable 3, so that after the suspension points of the suspension insulators 4 and the suspension points of the valve layer 5 are aligned in position, the working personnel suspend the valve layer 5 from the insulators 4. Till now, installation of the first valve layer 5 is completed.

Suspension and installation of the other valve layers and the bottom shielding case are the same as the foregoing statements, and details are not described herein again.

The present invention has been described according to particular exemplary embodiments here. It is apparent that a person skilled in the art may make appropriate substitution or modification without departing from the scope of the present invention. The exemplary embodiments are merely for illustration, rather than limiting the scope of the present invention. The scope of the present invention is subjected to the appended claims.

What is claimed is:

1. An assembly method for a DC converter valve, comprising the steps of:
   assembling a top shielding case: lifting the top shielding case to a designated height via a lifting platform, and then, fixedly connecting the top shielding case to lower ends of insulators, upper ends of suspension insulators are fixedly connected to a truss, and the truss is located on the top of a valve hall;
   assembling valve layers: lifting the valve layers to designated locations respectively in a sequence from top to bottom via the lifting platform; when a first valve layer is lifted to a designated location via the lifting platform, connecting the first valve layer to the top shielding case and suspending the first valve layer below the top shielding case via the suspension insulators; when an adjacent next valve layer is lifted to a designated location via the lifting platform, connecting the adjacent next valve layer to an adjacent previous valve layer and suspending the adjacent next valve layer below the adjacent previous valve layer via the suspension insulators; and repeating the foregoing steps of the assembling valve layers until a lowermost valve layer is connected to an adjacent previous valve layer and suspended below the adjacent previous valve layer; and
   assembling a bottom shielding case: lifting the bottom shielding case to a designated height via the lifting platform, and connecting the bottom shielding case to the lowermost valve layer and suspending the bottom shielding case below the lowermost valve layer via the suspension insulators.

2. The assembly method for a DC converter valve according to claim 1, wherein: an area of the lifting platform is respectively greater than an area of the top shielding case, an area of the valve layer, and an area of the bottom shielding case, a quantity of suspension insulators required by each valve layer can be placed on the lifting platform at the same time, and working personnel can stand thereon.

3. The assembly method for a DC converter valve according to claim 1, wherein: the lifting platform is provided with rollers at the bottom; before each lifting of the lifting platform, the lifting platform is moved horizontally on the ground to an appropriate location, and the top shielding case, the valve layers, or the bottom shielding case is placed on the lifting platform via a hoisting device.

4. The assembly method for a DC converter valve according to claim 3, wherein: the suspension insulators are also placed on the lifting platform.

5. The assembly method for a DC converter valve according to claim 4, wherein: during lifting of the lifting platform, the top shielding case, the valve layers, or the bottom shielding case is located at the center of the lifting platform, and the suspension insulators are evenly placed around the top shielding case, the valve layers, or the bottom shielding case.

6. The assembly method for a DC converter valve according to claim 1, wherein: once installation and fixation of the top shielding case, the valve layers, or the bottom shielding case are completed, the lifting platform is lowered to the ground for next lifting and installation.

7. The assembly method for a DC converter valve according to claim 1, wherein: lifting and lowering of the lifting platform is controlled via a suspension cable and pulleys.

8. The assembly method for a DC converter valve according to claim 2, wherein: once installation and fixation of the top shielding case, the valve layers, or the bottom shielding case are completed, the lifting platform is lowered to the ground for next lifting and installation.

9. The assembly method for a DC converter valve according to claim 3, wherein: once installation and fixation of the top shielding case, the valve layers, or the bottom shielding case are completed, the lifting platform is lowered to the ground for next lifting and installation.

10. The assembly method for a DC converter valve according to claim 4, wherein: once installation and fixation of the top shielding case, the valve layers, or the bottom shielding case are completed, the lifting platform is lowered to the ground for next lifting and installation.

11. The assembly method for a DC converter valve according to claim 5, wherein: once installation and fixation of the top shielding case, the valve layers, or the bottom shielding case are completed, the lifting platform is lowered to the ground for next lifting and installation.

12. The assembly method for a DC converter valve according to claim 2, wherein: lifting and lowering of the lifting platform is controlled via a suspension cable and pulleys.

13. The assembly method for a DC converter valve according to claim 3, wherein: lifting and lowering of the lifting platform is controlled via a suspension cable and pulleys.

14. The assembly method for a DC converter valve according to claim 4, wherein: lifting and lowering of the lifting platform is controlled via a suspension cable and pulleys.

15. The assembly method for a DC converter valve according to claim 5, wherein: lifting and lowering of the lifting platform is controlled via a suspension cable and pulleys.

* * * * *